Figure 4:
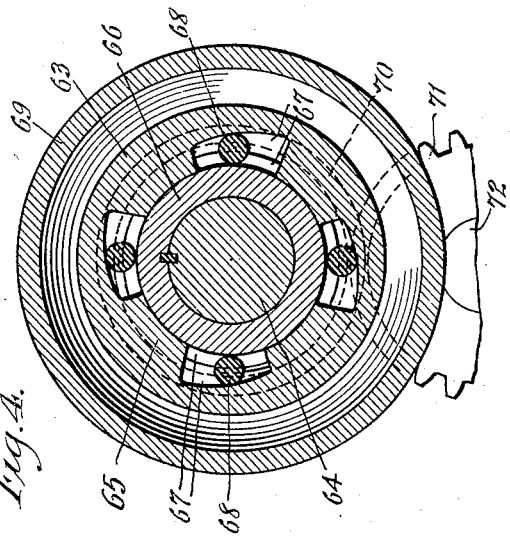

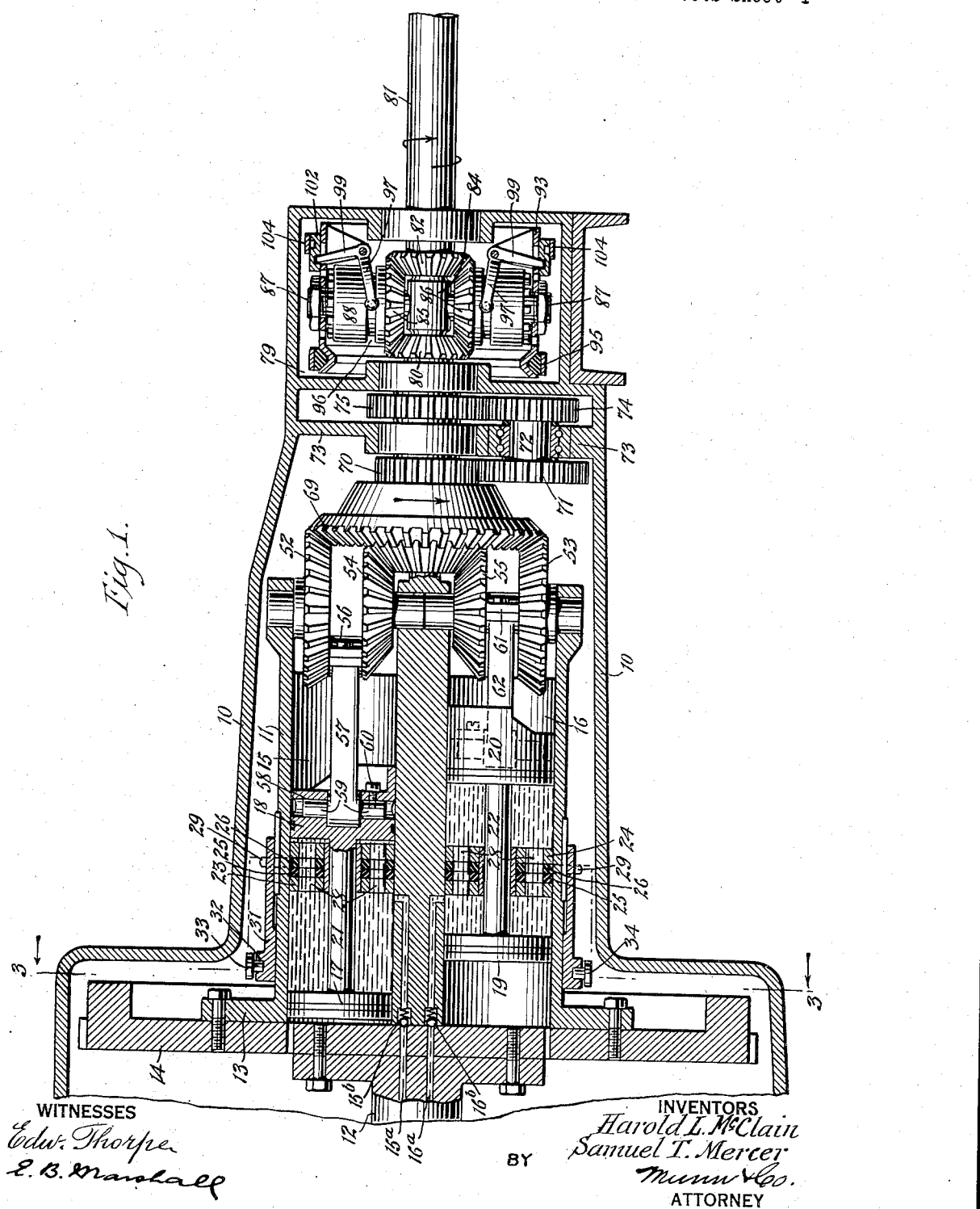

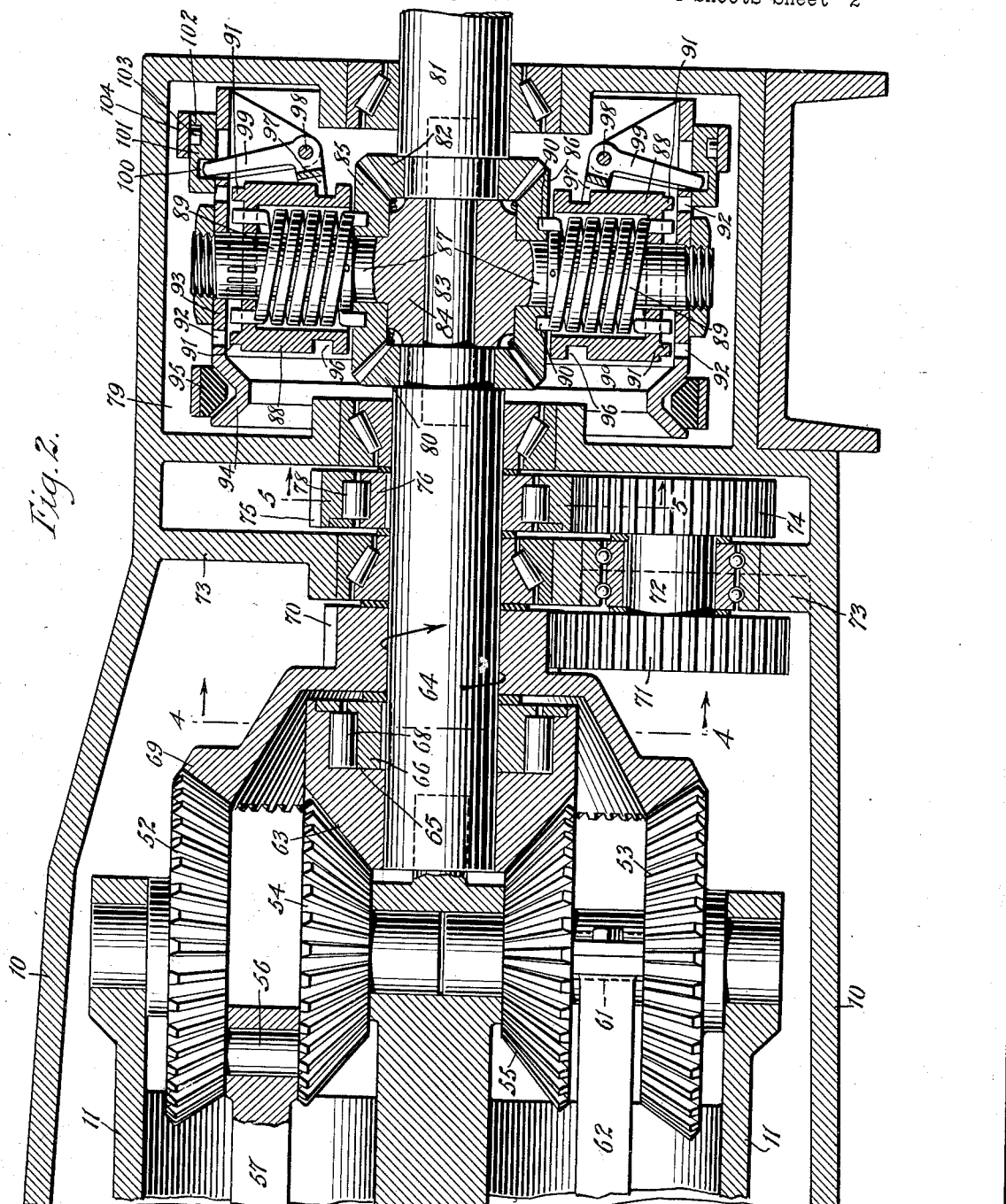

June 5, 1934.  H. L. McCLAIN ET AL  1,961,619
AUTOMATIC TRANSMISSION
Filed Sept. 9, 1932  4 Sheets-Sheet 3

INVENTORS
Harold L. McClain
Samuel T. Mercer
ATTORNEY

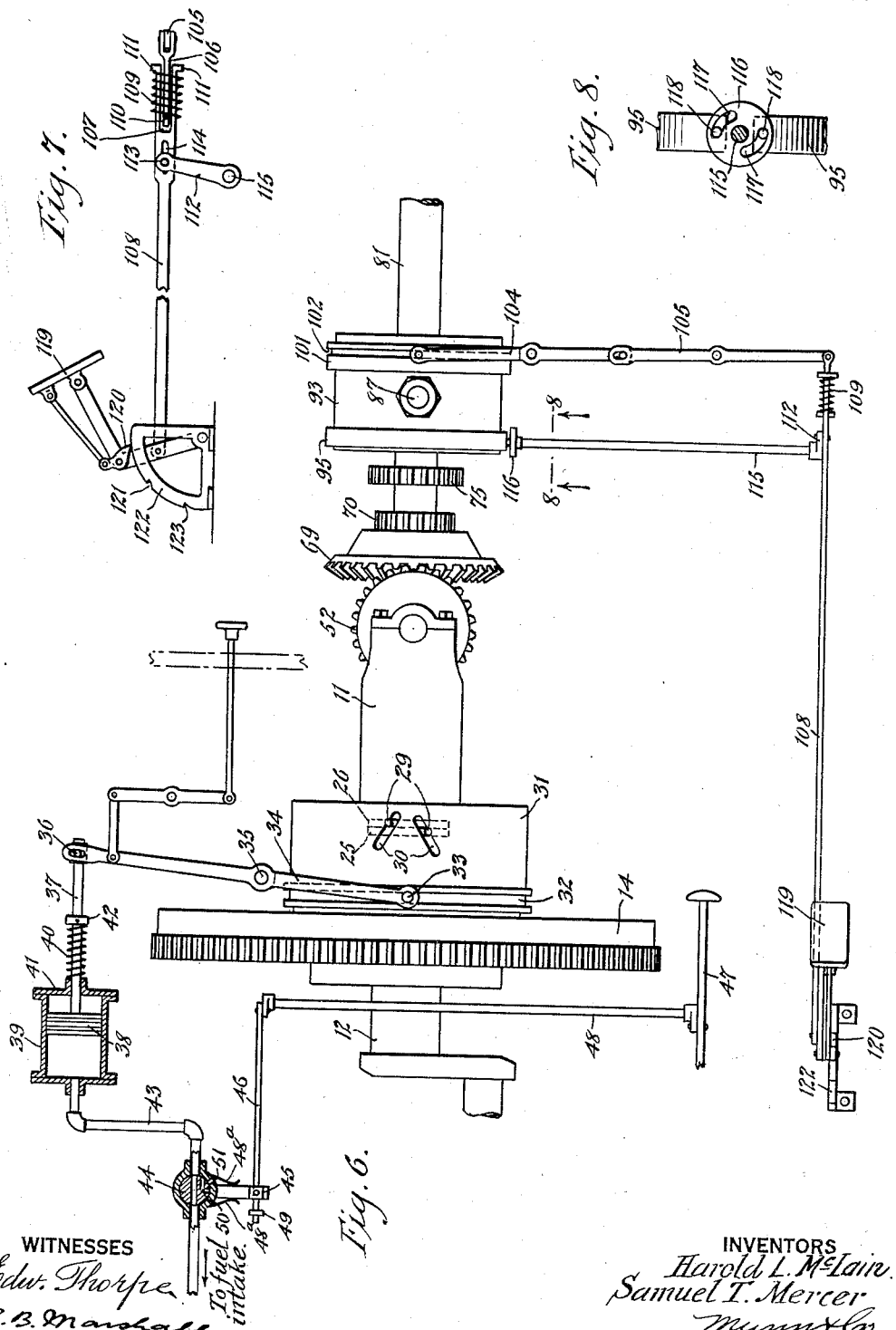

Patented June 5, 1934

1,961,619

UNITED STATES PATENT OFFICE 1,961,619

AUTOMATIC TRANSMISSION

Harold L. McClain and Samuel T. Mercer, Jamaica, N. Y.

Application September 9, 1932, Serial No. 632,456

18 Claims. (Cl. 74—34)

An object of the invention is to provide an automatic transmission which may be used for various purposes, but which is of particular value for use in automotive vehicles. The transmission removes altogether the human element in the selection of the most practicable gear ratio for all conditions of operation and makes possible the use of a high gear ratio as it removes the danger of an overloaded engine.

Another object of the invention is to provide means connected with the motor intake manifold to control the transmission by suction in the said intake. It will, therefore, be seen that, with the increase of the load on the motor, the decrease of suction pull is used to modify the transmission.

Still another object of the invention is to provide a cylinder or cylinders rotatable with the crank shaft of the motor, each cylinder having two pistons connected by a piston rod, with the piston rod extending through a bearing in a head of the cylinders between the pistons, with means to open and close communication through the head under the influence of a variation of suction at the manifold intake to adjust the transmission by a movement of the pistons with reference to the work required.

A further object of the invention is to provide two gears, each having a roller clutch disposed for rotating a shaft in the same direction, with automatic means to rotate the gears relatively to each other with reference to the load.

The invention has as a further object to provide a rotatable casing having two gears rotatably mounted on the casing and connected by two sets of gearing to two roller clutches for rotating a shaft which permits the adjustment of the clutches by the rotation of the first mentioned gears in the rotatable casing.

The invention also comprehends a reverse mechanism which has a rotatable unit carrying gears connecting gears on the driving and the driven shafts, means being provided to prevent rotation of the first mentioned gears on the unit to rotate the driven shaft with the rotation of the driving shaft and the unit; to permit the rotation of the unit and the rotation of the first mentioned gears on the unit to permit the rotation of the driving shaft while the driven shaft remains at rest; and to prevent the rotation of the unit while permitting the rotation of the first mentioned gears on the unit to rotate the driven shaft in reverse relatively to the driving shaft.

The invention further comprehends convenient means for operating the reverse mechanism.

Additional objects of the invention will appear in the following specification in which the preferred form of the invention is described.

Figure 5:
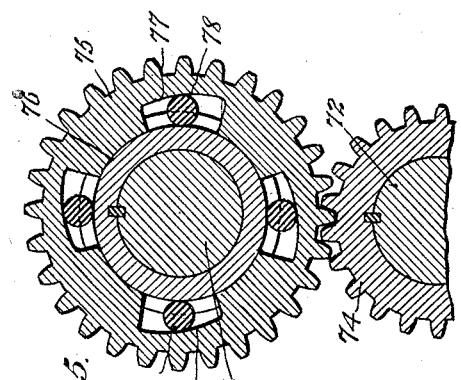
Figure 3:
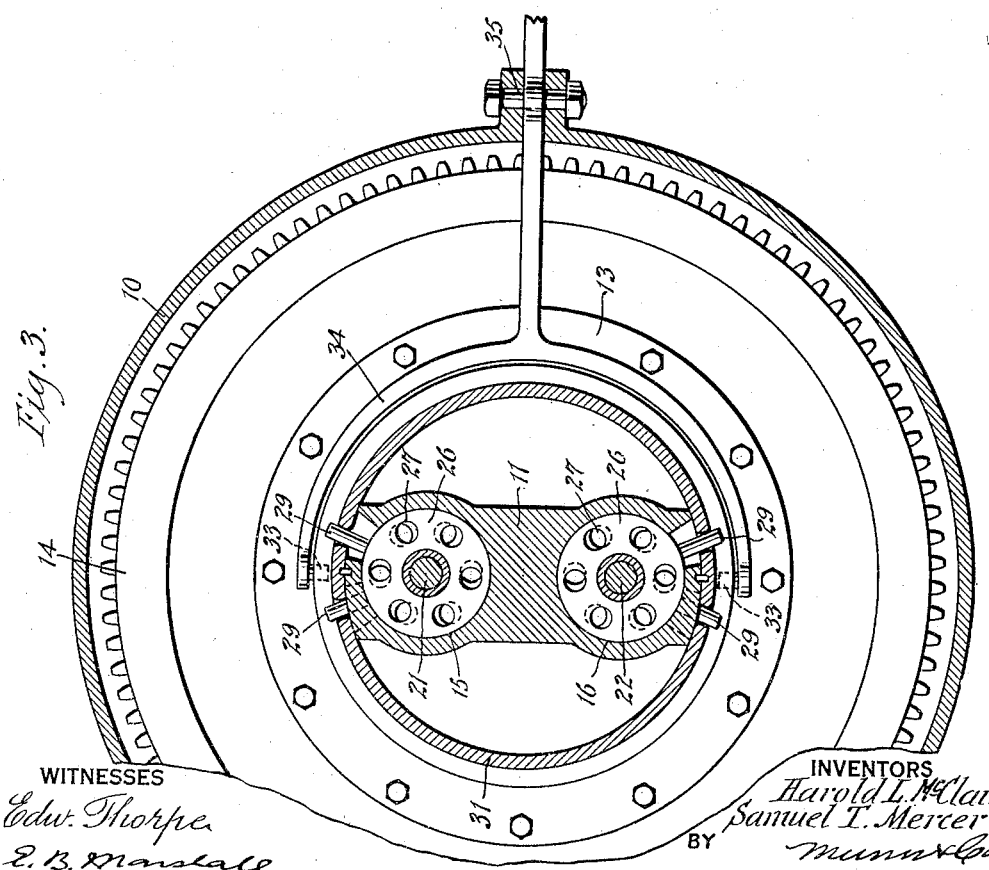

In the drawings similar reference characters refer to similar parts in all the views, of which Figure 1 is a sectional fragmentary view illustrating the transmission and the reverse, Figure 2 is a sectional fragmentary view showing the transmission gearing and the reverse as illustrated in Figure 1, but on an enlarged scale, Figure 3 is a sectional view on the line 3—3 of Figure 1, Figure 4 is a sectional view on the line 4—4 of Figure 2, Figure 5 is a sectional view on the line 5—5 of Figure 2, Figure 6 is a schematic view illustrating the suction operating means and also the means for controlling the reverse mechanism, Figure 7 is a side elevation of the pedal and the rod connected therewith for controlling the reverse mechanism, and Figure 8 is an enlarged sectional view on the line 8—8 of Figure 6.

By referring to the drawings it will be seen that there is a housing 10 which is integral with or which may be secured to the engine crankcase, and that a casing 11, disposed in the housing 10, is secured to rotate with the engine shaft 12, the casing 11 being preferably provided with a flange 13 which is bolted to the flywheel 14. The casing 11 has formed therein two cylinders 15 and 16, as shown in Figures 1, 2 and 3, there being two pistons 17 and 18 in the cylinder 15 and there being two pistons 19 and 20 in the cylinder 16, the pistons 17 and 18 being connected by a piston rod 21 and the pistons 19 and 20 being connected by a piston rod 22, the piston rod 21 being disposed through a bearing in the head 23 in the cylinder 15, the head 23 being disposed between the pistons 17 and 18, the piston rod 22 also being disposed through a bearing in the head 24, the said head 24 being disposed between the pistons 19 and 20. Each of the heads 23 and 24 has an annular recess in which are disposed two rotatable discs, the discs being indicated in the drawings by the reference characters 25 and 26, the discs 25 and 26 having apertures 27 which are disposed for registering with apertures 28 in the heads 23 and 24. The discs have projecting pins 29 which are disposed in angular slots 30 in a sleeve 31 which is keyed to the casing 11 to rotate therewith, but which has a longitudinal sliding movement thereon.

With the construction which has been described, it will be seen that, when the sleeve 31 is moved to the left, it will rotate the discs 25 and 26, so that their apertures 27 will register with the apertures 28 in the heads 23 and 24 on the cylinders 15 and 16.

The sleeve 31 has an annular guideway 32 in which pins 33 are disposed, the pins 33 being mounted on a bifurcated arm 34 pivoted at 35 and having a pin and slot connection 36 with a piston rod 37 on a piston 38 disposed in a cylinder 39, a spring 40 being mounted on the piston rod 37 and extending between the head 41 of the cylinder 39 and a collar 42 on the piston rod 37 for holding the piston rod 37 and the bifurcated arm 34 yieldingly in the position illustrated in Figure 6. The cylinder 39 is connected by a pipe or conduit 43 to a fuel intake manifold, there being a rotary valve 44 in the conduit, the rotary valve 44 having a valve arm 45 with an aperture through which a rod 46 extends, the rod 46 being connected with an accelerator 47 by a crank shaft 48. This construction is provided so that, when the accelerator 47 is in use, the valve 44 will be moved to the position illustrated in Figure 6 by means of the spring arms 48ª which engage the valve arm 45, but, when pressure is removed from the accelerator 47, the button 49 on the rod 46 will serve to move the valve arm 45, and with it the valve 44, to a position where the by-pass 50 will serve to connect the cylinder 39 to a port 51 which leads to the atmosphere. Therefore, it will be understood that, when the pressure is removed from the accelerator 47, air may flow to the cylinder.

On referring to Figures 1 and 2 of the drawings it will be seen that journaled in the casing 11 there is a gear 52 with its companion gear 53 and a gear 54 with its companion gear 55, the said gears 52, 53, 54 and 55 being rotatable in the casing 11 and the gears 52 and 54, which are spaced apart, are connected by a crank 56 to which is articulated a piston rod 57, the piston rod 57 being journaled in a bearing 58 in the piston 18 and being provided with a pin 59 disposed in the said bearing, the said pin 59 being held against movement in the said bearing by means of a set screw 60. There is a crank 61 which is disposed between the gears 53 and 55 and is connected therewith, the said crank 61 being articulated to a piston rod 62 and the piston rod 62 being articulated to the piston 20 in the manner set forth with reference to the piston rod 57.

As will best be seen by referring to Figure 2, a gear 63 is mounted on a shaft 64, the gear 63 meshing with the gears 54 and 55, the gear 63 being connected with the shaft 64 by a roller clutch 65 which operates with a clutch member 66 which is keyed to the shaft 64. The gear 63 and the clutch member 66 have the usual converging channels 67 which are shown in Figure 4, there being the usual rollers 68 in the said channels. It will be understood that, when the gear 63 rotates in a clockwise direction, as shown in Figure 4, the roller clutch means 65 serves to rotate the shaft 64 in a clockwise direction, but, when the rotation of the gear 63 is sufficiently retarded relatively to the shaft 64, the gear 63 will move freely of the shaft 64, that is, it will free-wheel. The gear 69 meshes with the gears 52 and 53, as shown in Figures 1 and 2, and this gear 69 is mounted freely on the shaft 64, the gear 69 having teeth 70 which mesh with a gear 71 mounted on a counter shaft 72 journaled in bearings in a partiton 73 in the housing 10, another gear 74 being mounted on the shaft 72 and meshing with a gear 75 which is connected with the shaft 64 by means of a roller clutch mechanism having a member 76 which is keyed to the said shaft 64. The gear 75 and the clutch member 76 have the usual converging channels 77 with the rollers 78 for rotating the shaft 64 by means of the gear 75 under certain conditions. It will be noticed that the gear 75, as driven by the train of gears which has been described, will rotate the shaft 64 at only one-half the speed of the gear 63, but will give double the power.

Under the suction of the motor, when the piston 38 is moved to the left and the sleeve 31 is moved to the right, it will serve to close the discs 25 and 26 to prevent the flow of oil or other fluid through the apertures 28 in the heads 23 and 24. When this has been done, it will be understood that it will not be possible for the oil or other fluid to pass from one side of the heads 23 and 24 to the other sides of the said heads and, therefore, the pistons 17, 18, 19 and 20 will not move relatively to their cylinders 15 and 16. Therefore, it will be impossible for the gears 52, 53, 54 and 55 to rotate relatively to the casing 11 and as the shaft 12 and the flywheel 14 rotate in a clockwise direction, the gears 52, 53, 54 and 55 will force the gears 63 and 69 to rotate in the same direction and at the same speed. The gear 63 will serve to rotate the shaft 64 through the roller clutch means 65, which has been described, at the same speed as the shaft 12 and its flywheel 14, giving a direct drive to the shaft 64. Inasmuch as the gear 75 travels at only one-half the speed of the gear 63, its movement in relation to the shaft 64 is retarded and, therefore, it is free on the shaft 64.

When the load is increased, as, for instance, where the transmission is applied to an automotive vehicle and the automotive vehicle is on a steep grade or hard pull, the increase of the load on the engine will cause a proportional decrease of suction pull in the intake manifold of the internal combustion engine. When this takes place, the spring 40 on the piston rod 37 will serve to move the piston 38 and the bifurcated arm 34 to the position shown in Figure 6, which will move the discs 25 and 26 to open communication through the apertures 28 in the cylinder heads 23 and 24, the opening uncovered by the discs 25 and 26 at the apertures depending on the extent to which the intake manifold of the engine has been decreased. With the apertures 28 in the cylinder heads 23 and 24 uncovered, either partially or wholly, oil or other fluid contained in the cylinders will be permitted to flow through the apertures from one side of the heads to the other side of the heads and the movement of the pistons in the cylinders 15 and 16 will, by means of the piston rods 57 and 62, serve to control the rotation of the gears 52, 53, 54 and 55 relatively to the casing 11, the rotation of these gears serving to rotate the gears 63 and 69 relatively to the casing at various speeds according to the speed of rotation of said gears 52, 53, 54, and 55 and the speed of rotation of the latter being governed by the extent to which the apertures 28 are opened. It will be understood that, with this movement, the shaft 12 and the flywheel 14 will rotate faster than the shaft 64, which gives a certain limited advantage to the engine, inasmuch as it is able to deliver more power at a higher rate of speed than when laboring slowly, but, inasmuch as this advantage is limited, it is necessary to provide other means for completing the results desired. Therefore, the ratio between the gears 54 and 55 and the gear 63 is different from the ratio between the gears 52 and 53 and the gear 75, so that the gear 63 will rotate at twice the speed of the gear 75. When the shaft 12 with the flywheel 14 begins to rotate faster than the shaft 64, the gear 63 will continue to be the pulling factor until such a point of difference is reached that, owing to the different ratios, the rotation of the shaft 64 will be retarded relatively to the shaft 12 and the flywheel 14 until the shaft 64 rotates only as fast as the gear 75, when the gear 75 will become the pulling factor, giving the motor a definite two-to-one mechanical gear ratio. It will also be understood that, as the gear 69 through the gear 71, countershaft 72, gear 74 and to the gear 75 becomes the pulling factor, the rate of the speed of the gears 54 and 55 becomes so great that, instead of it having a tendency to drive the gear 63 in a clockwise direction and with the shaft 64, the gear 63 free-wheels at its roller clutch 65 over the shaft 64.

By referring to Figure 1 of the drawings, it will be seen that there are two conduits 15ª and 16ª which extend through the shaft 12 and the casing 11, the conduit 15ª leading to the cylinder 15 and the conduit 16ª leading to the cylinder 16. There are check valves 15ᵇ and 16ᵇ in these conduits, the conduits 15ª and 16ª leading from the pressure oiling system and serving to keep the cylinders 15 and 16 full of oil under all conditions.

In connection with the transmission there is a reverse unit which is shown in the compartment 79 in the housing. This construction is best shown in Figure 2, where the shaft 64 has a gear 80 and another shaft 81 has a gear 82, the shafts 64 and 81 having axial bearings in which the ends of a shaft 83 are journaled, the shaft 83 carrying a unit 84 having rotatable gears 85 and 86 which mesh with the gears 80 and 82. The gears 85 and 86 rotate on radially extending members 87, the radially extending members 87 carrying casings 88 which are keyed to the radially extending members 87 but which have outward and inward movement thereon. Springs 89 are disposed around the radially extending members 87, the said springs 89 having terminals 90 disposed in apertures in the gears 85 and 86, the casings 88 being provided with studs 91 for disposal in apertures 92 in a drum 93, so that the drum 93 will rotate with the radially extending members 87. The drum 93 has an annular guideway 94 at which a brake band 95 is disposed.

With the construction which has been described, it will be understood that, when the casing 88 is moved outwardly so that its studs 91 will be disposed in the apertures 92 in the drum 93, the rotation of the gears 85 and 86 on the unit 84 will be prevented, and that, with the rotation of the shaft 64, the unit will rotate therewith and rotate with it the shaft 81. When the casing 88 is moved inwardly to the position shown in Figure 2, the rotation of the gears 85 and 86 will be permitted and the unit 84 will also rotate as a whole. With the rotation of the shaft 64, the shaft 81 may remain at rest under these condition. When the brake band 95 engages the annular guideway 94 in the drum 93 to prevent the rotation of the unit and, while the gears 85 and 86 are permitted to rotate, the shaft 64 will rotate the shaft 81 through the gears 80, 85, 86 and 82 in a reverse direction relatively to the shaft 64. Therefore, it will be seen that with this unit a forward drive may be obtained, as well as a rearward drive and, also, that the shaft 81 may remain at rest when desired relatively to the rotation of the shaft 64.

As a means of moving the casings 88 inwardly and outwardly as desired, the casings are provided with annular grooves 96 on which pins on bifurcated members 97 are disposed, the bifurcated members 97 being pivoted at 98 and having arms 99 disposed in recesses 100 in an annular slide 101, the annular slide 101 being mounted on the drum 93 and having an annular recess 102 in which the pins 103 on bifurcated arms 104 are disposed. The bifurcated arms 104 are connected by levers 105 with a shank 106 which is disposed in a recess 107 in a rod 108, a spring 109 being disposed around the shank 106 and the rod 108 engaging a stop 110 on the shank 106 and flanges 111 on the rod 108. By referring to Figure 7 it will be seen that, with a movement of the rod 108 to the left, the slide 101 will be moved to the left, as shown in Figure 2, which is the neutral position, and that, with the further movement of the rod 108, the arm 112 will be rocked by means of its pin 113 in the slot 114 to rotate the shaft 115 which has a disc 116 with arcuate slots 117 in which pins 118 on the brake band 95 are disposed. Therefore, it will be understood that, with the pedal 119 in the position illustrated in Figure 7, the casing 88 will be moved outwardly so that the studs 91 thereon will be disposed in the apertures 92 in the drum 93 and that, when the pedal moves downwardly sufficiently to permit its pawl 120 to be disposed in the recess 121 in the quadrant 122, the rod 108 will be moved sufficiently to the left to operate the bifurcated member 97 to move the casing 88 inwardly to the position shown in Figure 2, which is the neutral position, and that, with the further movement of the rod 108 to the left, and with the pawl 120 disposed in the recess 123, the brake band 95 will be tightened by the means described, which will prevent the rotation of the drum 93 and the unit 84 and which will serve to drive the shaft 81 in a reverse direction relatively to the driving shaft 64.

It will be understood that by putting the shaft 81 in reverse and by speeding up the motor the automotive vehicle may be held back when going down a steep hill.

What is claimed is:

1. In a transmission, a shaft, a casing carried by the shaft and having a cylinder, a head in the cylinder between the cylinder ends, a bearing and an aperture in the head, a piston rod extending through the bearing, two pistons, one disposed at each side of the head and being secured to the piston rod, a second shaft, a train of gears, means connecting a gear of the train with the second mentioned shaft, crank means connecting the piston rod with another gear of the train for controlling the rotation of the last mentioned gear relatively to the casing, and means for closing the aperture in the head.

2. In a transmission, a shaft, a casing rotatable with the shaft, gearing having a gear rotatably mounted on the casing, fluid pressure means controlling the rotation of the said gear relatively to the casing, a second shaft, and clutch means connecting another gear of the gearing with the second mentioned shaft for rotating the latter; said gears meshing with each other.

3. In a transmission, a rotatable casing, gearing having a gear rotatably mounted on the casing, a shaft, clutch means connecting another gear of the gearing with the shaft for rotating the latter, said first-mentioned gear meshing with the second-mentioned gear, a suction means, and means connecting the suction means with the first mentioned gear of the gearing which controls the rotation of the first mentioned gear relatively to the casing.

4. In a transmission, a rotatable casing, two sets of gearing each having a gear rotatable on the casing, means for controlling the rotation of the said gears of the two sets of gearing relatively to the casing, a shaft, and clutch means for connecting another gear of each of the two sets of gearing with the shaft for rotating the latter, the two sets of gearing serving to rotate the shaft at different speeds.

5. In a transmission, a rotatable casing, two sets of gearing each having a gear rotatable on the casing, adjustable fluid pressure means controlling the rotation of the said gears of the two sets of gearing relatively to the casing, a shaft, and clutch means for connecting another gear of each of the two sets of gearing with a shaft for rotating the latter, the two sets of gearing serving to rotate the shaft at different speeds.

6. In a transmission, a rotatable casing, two sets of gearing each having a gear rotatable on the casing, means controlling the rotation of the said gears of the two sets of gearing relatively to the casing, suction means for operating the first mentioned means, a shaft, and clutch means for connecting another gear of each of said gearing with the shaft for rotating the latter, the two sets of gearing serving to rotate the shaft at different speeds.

7. In a transmission, a rotatable casing, a gear rotatable on the casing, a second gear rotatable on the casing, means for regulating the rotation of the two gears relatively to the casing, a shaft, a gear on the shaft meshing with the first mentioned gear, a roller clutch connecting the third mentioned gear with the shaft for rotating the latter, a fourth gear mounted to rotate on the shaft and meshing with the second mentioned gear, a fifth gear mounted on the shaft, a roller clutch connecting the fifth mentioned gear with the shaft for rotating the latter, and gearing connecting the fourth mentioned gear with the fifth mentioned gear for rotating the shaft by the fifth mentioned gear at a speed different from the speed of rotation of the shaft by the third mentioned gear.

8. In a transmission, a rotatable casing, a gear rotatable on the casing, a second gear rotatable on the casing, means for regulating the rotation of the two gears relatively to the casing, suction means for operating the first mentioned means, a shaft, a gear on the shaft meshing with the first mentioned gear, a roller clutch connecting the third mentioned gear with the shaft for rotating the latter, a fourth gear mounted to rotate on the shaft and meshing with the second mentioned gear, a fifth gear mounted on the shaft, a roller clutch connecting the fifth mentioned gear with the shaft for rotating the latter, and gearing connecting the fourth mentioned gear with the fifth mentioned gear for rotating the shaft by the fifth mentioned gear at a speed different from the speed of rotation of the shaft by the third mentioned gear.

9. In a transmission, a rotatable casing, a gear rotatable on the casing, a second gear rotatable on the casing, a fluid pressure means for regulating the rotation of the two gears relatively to the casing, a shaft, a gear on the shaft meshing with the first mentioned gear, a roller clutch connecting the third mentioned gear with the shaft for rotating the latter, a fourth gear mounted to rotate on the shaft and meshing with the second mentioned gear, a fifth gear mounted on the shaft, a roller clutch connecting the fifth mentioned gear with the shaft for rotating the latter, and gearing connecting the fourth mentioned gear with the fifth mentioned gear for rotating the shaft by the fifth mentioned gear at a speed different from the speed of rotation of the shaft by the third mentioned gear.

10. In a transmission, a rotatable casing, a gear rotatable on the casing, a second gear rotatable on the casing, means for regulating the rotation of the two gears relatively to the casing, a suction means for operating the first mentioned means, a motor accelerator, means operable by the motor accelerator for controlling the suction means, a shaft, a gear on the shaft meshing with the first mentioned gear, a roller clutch connecting the third mentioned gear with the shaft for rotating the latter, a fourth gear mounted to rotate on the shaft and meshing with the second mentioned gear, a fifth gear mounted on the shaft, a roller clutch connecting the fifth mentioned gear with the shaft for rotating the latter, and gearing connecting the fourth mentioned gear with the fifth mentioned gear for rotating the shaft by the fifth mentioned gear at a speed different from the speed of rotation of the shaft by the third mentioned gear.

11. In a transmission, a rotatable casing having a cylinder, two pistons spaced apart and disposed in the cylinder, a piston rod connecting the pistons, a head in the cylinder disposed between the pistons and having a bearing in which the piston rod is disposed, the head having an aperture, means for closing the aperture, a gear rotatably mounted on the casing, means connecting a piston with the gear for controlling the rotation of the latter, a shaft, means to rotate the shaft, and gearing operatively connecting the gear with the last mentioned means.

12. In a transmission, a rotatable casing having a cylinder, two pistons spaced apart and disposed in the cylinder, a piston rod connecting the pistons, a head in the cylinder disposed between the pistons and having a bearing in which the piston rod is disposed, the head having an aperture, means for closing the aperture, suction means for operating the first mentioned means, a gear rotatably mounted on the casing, means connecting a piston with the gear for controlling the rotation of the latter, a shaft, means to rotate the shaft, and gearing operatively connecting the gear with the last mentioned means.

13. In a transmission, a rotatable casing having two cylinders, two pistons spaced apart and connected by a piston rod in each cylinder, a head in each cylinder between the pistons therein and having a bearing in which the piston rod is disposed, each head having an aperture, means for closing the apertures, two gears rotatably mounted on the casing, a crank means connecting a piston in one cylinder with the two gears for rotating the latter, two additional gears rotatably mounted on the casing, a second crank means connecting a piston in the other cylinder with the said two additional gears for controlling the rotation of the latter, a shaft, a fifth gear mounted on the shaft and meshing with a gear of the first mentioned gears and a gear of the second mentioned gears, a roller clutch connecting the fifth mentioned gear with the shaft for rotating the latter, a sixth gear mounted on the shaft and meshing with the other gear of the first mentioned gears and the other gear of the second mentioned gears, a seventh gear mounted on the shaft, a roller clutch connecting the seventh mentioned gear with the shaft for rotating the latter, and gearing connecting the sixth and seventh mentioned gears.

14. In a transmission, a rotatable casing having two cylinders, two pistons spaced apart and connected by a piston rod in each cylinder, a head in each cylinder between the pistons therein and having a bearing in which the piston rod is disposed, each head having an aperture, means for closing the apertures, two gears rotatably mounted on the casing, a crank means connecting a piston in one cylinder with the two gears for controlling the rotation of the latter, two additional gears rotatably mounted on the casing, a second crank means connecting a piston in the other cylinder with the said two additional gears for rotating the latter, a shaft, a fifth gear mounted on the shaft and meshing with a gear of the first mentioned gears and a gear of the second mentioned gears, a roller clutch connecting the fifth mentioned gear with the shaft for rotating the latter, a sixth gear mounted on the shaft and meshing with the other gear of the first mentioned gears and the other gear of the second mentioned gears, a seventh gear mounted on the shaft, a roller clutch connecting the seventh mentioned gear with the shaft for rotating the latter, gearing connecting the sixth and seventh mentioned gears, and suction means for operating the first mentioned means.

15. In a transmission, a shaft, a casing rotatable with the shaft and having cylinders, gears rotatably mounted on the casing, piston means in the cylinders for controlling the rotation of the gears, the shaft and casing having conduits leading to the cylinders, check valves in the conduits which permit a liquid to flow to the cylinders, a second shaft, and means connecting the gears with the second shaft for rotating the latter.

16. In a transmission, a driven shaft, driving means, a clutch to couple and uncouple said shaft and driving means, driven means operated by said driving means, said driving and driven means having relatively different speed ratios, a second clutch to couple and uncouple said shaft and driven means, one clutch being engaged as the other is released in response to the operation of the driving means and according to changes in the speed thereof, and fluid control means for controlling the operation of said driving means, to change the speed of said shaft.

17. In a transmission, a driven shaft, driving means, a clutch to couple and uncouple said shaft and driving means, driven means operated by said driving means, said driving and driven means having relatively different speed ratios, a second clutch to couple and uncouple said shaft and driven means, one clutch being engaged as the other is released in response to the operation of the driving means and according to changes in the speed thereof, and suction responsive fluid control means for controlling the operation of said driving means to change the speed thereof.

18. In an automatic transmission, a driven shaft, transmission means, a clutch connecting one part of said means with said shaft for driving said shaft at relatively high speeds, a second clutch connecting another part of said means with said shaft for driving said shaft at relatively low speeds, one clutch being engaged as the other is released according to changes in the speed of the transmission means, and fluid control means for controlling the operation of said transmission means.

HAROLD L. McCLAIN.
SAMUEL T. MERCER.